(12) United States Patent
Han et al.

(10) Patent No.: US 6,441,893 B1
(45) Date of Patent: Aug. 27, 2002

(54) MEASUREMENT METHOD OF RESONANT NONLINEARITY IN A NONLINEAR OPTICAL FIBER USING A LONG PERIOD FIBER GRATING PAIR

(75) Inventors: Won Taek Han, Daejon; Yune Hyoun Kim, Kwangju, both of (KR)

(73) Assignee: Kwangju Institute of Science and Technology, Kwangju (KR)

( * ) Notice: Subject to any disclaimer, the term of this patent is extended or adjusted under 35 U.S.C. 154(b) by 0 days.

(21) Appl. No.: 09/988,609

(22) Filed: Nov. 20, 2001

(30) Foreign Application Priority Data

Sep. 4, 2001 (KR) ............................................. 01-54149

(51) Int. Cl.[7] .............................................. G01N 21/00
(52) U.S. Cl. ...................................................... 356/73.1
(58) Field of Search ................................ 356/73.1, 480; 385/12; 250/227.19, 227.27; 372/6

(56) References Cited

U.S. PATENT DOCUMENTS

| 4,316,147 A | * | 2/1982 | Khan et al. ................. 324/300 |
| 4,787,714 A | * | 11/1988 | Greene et al. .............. 359/241 |
| 6,055,391 A | * | 4/2000 | Jackson et al. ............. 356/614 |

FOREIGN PATENT DOCUMENTS

JP          402050490 A  *  2/1990

* cited by examiner

*Primary Examiner*—Frank G. Font
*Assistant Examiner*—Tu T. Nguyen
(74) *Attorney, Agent, or Firm*—Greenblum & Bernstein, P.L.C.

(57) ABSTRACT

The present invention relates to a measurement method of resonant nonlinearity in a nonlinear optical fiber using a long period fiber grating pair. In particular, it relates to a characteristic evaluation method that can simply, but accurately, measure the nonlinear optical characteristics of an optical fiber.

4 Claims, 3 Drawing Sheets

MEASUREMENT METHOD OF RESONANT NONLINEARITY IN A NONLINEAR OPTICAL FIBER USING A LONG PERIOD FIBER GRATING PAIR

BACKGROUND OF THE INVENTION

1. Field of the Invention

The present invention relates to a measurement method of resonant nonlinearity in a nonlinear optical fiber using a long period fiber grating pair. In more detail, it relates to a characteristic evaluation method that can simply, but accurately, measure the nonlinear optical characteristics of an optical fiber.

2. Description of the Related Art

Recently in the field of optical communication, researches on all-optical switch element using resonant nonlinearity of nonlinear optical fiber is being actively in progress. Here, "resonant nonlinearity" means for nonlinearity obtained in an optical communication band by using a pump light source matching with the light absorption band of nonlinear material doped into an optical fiber. As a foundation of these researches, measurement of nonlinearity of the optical fiber should be performed.

In the prior art, the following methods has been used for measuring resonant nonlinearity of a nonlinear optical fiber:

One is a method using "pulse broadening". This method is based on a characteristic that, when a pulse having a very narrow frequency width transmits through a nonlinear optical fiber, the pulse width is changed by resonant nonlinearity of the optical fiber. Since the pulse width is generally broadened by nonlinearity of an optical fiber, the method is called by "pulse broadening", and nonlinearity of an optical fiber can be measured by the extent of pulse broadening.

Another method is a pump-probe method. This method employs a laser, which is able to scan a wide frequency band, as a light source and measures nonlinearity of an optical fiber by observing light absorption change in a wide frequency band according to the output power of a pump light source. This method is not only used for measuring nonlinearity of an optical fiber but also widely used for measuring nonlinearity of general materials.

Besides, there is another method using a Mach-Zehnder interferometer. This method splits a light source 50 to 50, transmits one beam through an optical fiber having resonant nonlinearity and the other beam through an optical fiber not having resonant nonlinearity and a phase modulator, and combines the two beams thereafter. Then, there exists a phase difference between the two beams, and the method compensates the difference by using a phase modulator to measure the nonlinearity.

These are frequently used methods for measuring nonlinearity of an optical fiber, however, they have the following disadvantages:

First, for using a pulse broadening method, the key element is a pulse having a very narrow frequency width, however, it is not easy to produce a pulse having such a narrow frequency width. And a pump-probe method requires an expensive laser light source that is able to scan a wide frequency band.

And for applying a method using a Mach-Zehnder interferometer, since the method basically uses interference between two beams, it is required to arrange optical elements installed on their optical paths carefully to cause the interference. Additionally, it requires a comparably expensive phase modulator.

SUMMARY OF THE INVENTION

The present invention is proposed to solve the problems of the prior art mentioned above. It is therefore the object of the present invention to provide a cheap and easy measurement method of resonant nonlinearity in a nonlinear optical fiber that dissolves the disadvantages of prior art.

To achieve the object mentioned above, the present to invention presents a measurement method of resonant nonlinearity in a nonlinear optical fiber using a long period fiber grating pair characterized by: connecting a nonlinear optical fiber (20) between a first long period fiber grating (10a) and a second long period fiber grating (10b); injecting light from a pump light source (30) for causing resonant nonlinearity, and at the same time, injecting light from a light source (40) of which the nonlinearity is to be measured through the first long period fiber grating (10a) or the second long period fiber grating (10b) at one side; transmitting the light from the two light sources (30,40) through the nonlinear optical fiber (20) and the second long period fiber grating (10b) or the first long period fiber grating (10a) at the other side; and thereafter measuring the light from the light source (40) of which the nonlinearity is to be measured by a spectrum analyzer (60) using the change of interference pattern formed by the long period fiber grating pair (10a, 10b).

DESCRIPTION OF THE NUMERALS ON THE MAIN PARTS OF THE DRAWINGS

Figure 1:
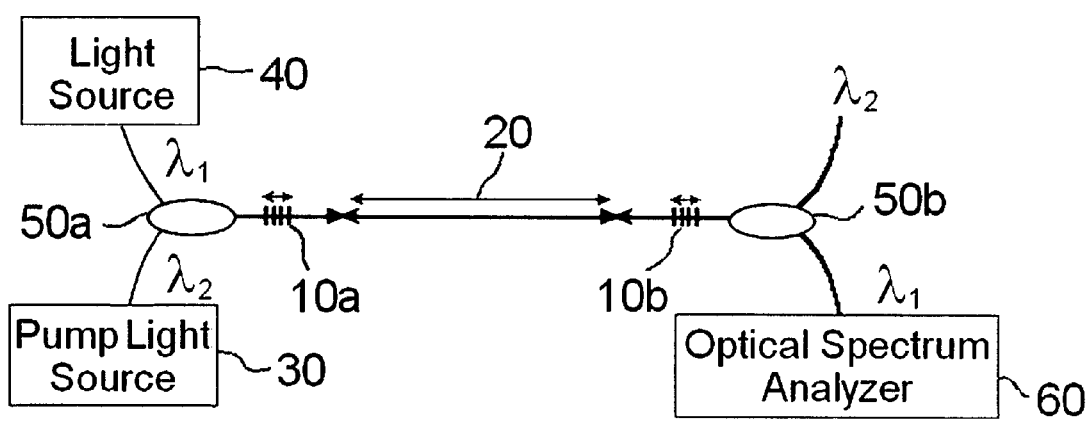
FIG. 1 is a view illustrating the structure of a measurement system of resonant nonlinearity in a nonlinear optical fiber using a long period fiber grating pair in accordance with the present invention.

10a : a first long period fiber grating
10b : a second long period fiber grating
20 : a nonlinear optical fiber
30 : a pump light source
40 : a light source
60 : an optical spectrum analyzer (OSA)

50a : a first wavelength division multiplexer
50b : a second wavelength division multiplexer

DETAILED DESCRIPTION OF THE EMBODIMENTS

Hereinafter, referring to appended drawings, the structures and the operation procedures of the embodiments of the present invention are described in detail.

A measurement method in accordance with the present invention is based on a characteristic of light that, when light propagating through an optical fiber core meets a pair of long period fiber gratings, some portion of the light propagates through the core and the other portion of the light propagates through the clad by the first long period fiber grating, and the split lights propagating through the core and the cladding are combined together by the second long period fiber grating, and the combined light propagates through the core with an interference being occurred therein. (B. H. Lee and J. Nishii, "Bending sensitivity of in-series long-period fiber gratings," Opt. Lett., vol. 23, No. 20, pp. 1624~1626, 1998) Therefore, the measurement method in accordance with the present invention is carried out by inserting a nonlinear optical fiber between a long period fiber grating pair and thereafter measuring the nonlinearity of the nonlinear optical fiber caused by a pump light source, which is not affected by the long period fiber grating pair, by measuring an interference pattern change. (M. J. F. Digonnet, R. W. Sadowski, H. J. Shaw, and R. H. Pantell, "Resonantly Enhanced Nonlinearity in Doped Fibers for Low-Power All-Optical Switching: A Review," Opt. Fiber Technol., vol. 3, pp. 44~64, 1997)

FIG. 1 is a view illustrating the structure of a measurement system of resonant nonlinearity in a nonlinear optical fiber using a long period fiber grating pair in accordance with the present invention.

Referring to FIG. 1, the measurement system is constructed by connecting a nonlinear optical fiber (20), of which the nonlinearity is to be measured, between a first and a second long period fiber gratings (10a, 10b) having the same grating period by using a fusion splicer and connecting a first and a second wavelength division multiplexers (50a, 50b), which are able to divide or combine a pump light source (30) and a light source (40) of which nonlinearity is to be measured, to the first and the second long period fiber gratings (10a, 10b), respectively. And the measurement is carried out by injecting a pump light and a light of which nonlinearity is to be measured to an input end, obtaining the information on interference pattern change formed by the first and the second long period fiber gratings (10a10b) and caused by the pump light source (30) by using an optical spectrum analyzer (60) at an output end where the light from the light source (40) of which nonlinearity is to be measured comes out, and measuring nonlinearity of the optical fiber therefrom.

In other words, it can measure the resonant nonlinearity of a nonlinear optical fiber at a desired wavelength band by changing the grating period of a long period fiber grating pair (10a, 10b) and using the first and the second wavelength division multiplexers (50a, 50b) that are able to divide or combine a pump light source (30) and a light source (40) of which nonlinearity is to be measured.

Here, $\lambda_1$ is the wavelength of a light of which nonlinearity is to be measured, and $\lambda_2$ is the wavelength of a pump light applied for causing resonant nonlinearity. A laser diode (LD) is used for a pump light source, and a first and a second wavelength division multiplexers (WDM) take roles in dividing or combining the beams of $\lambda_1$ and $\lambda_2$. An optical spectrum analyzer (OSA) (60) shows an optical spectrum at $\lambda_1$ band formed by long period fiber grating pair. Here, the first and the second long period fiber gratings (10a, 10b) and the nonlinear optical fiber (20) can be made of a glass or a polymer material.

The method of measuring nonlinearity of a nonlinear optical fiber (20) using a pump light source (30) is now described in detail.

Figure 2:
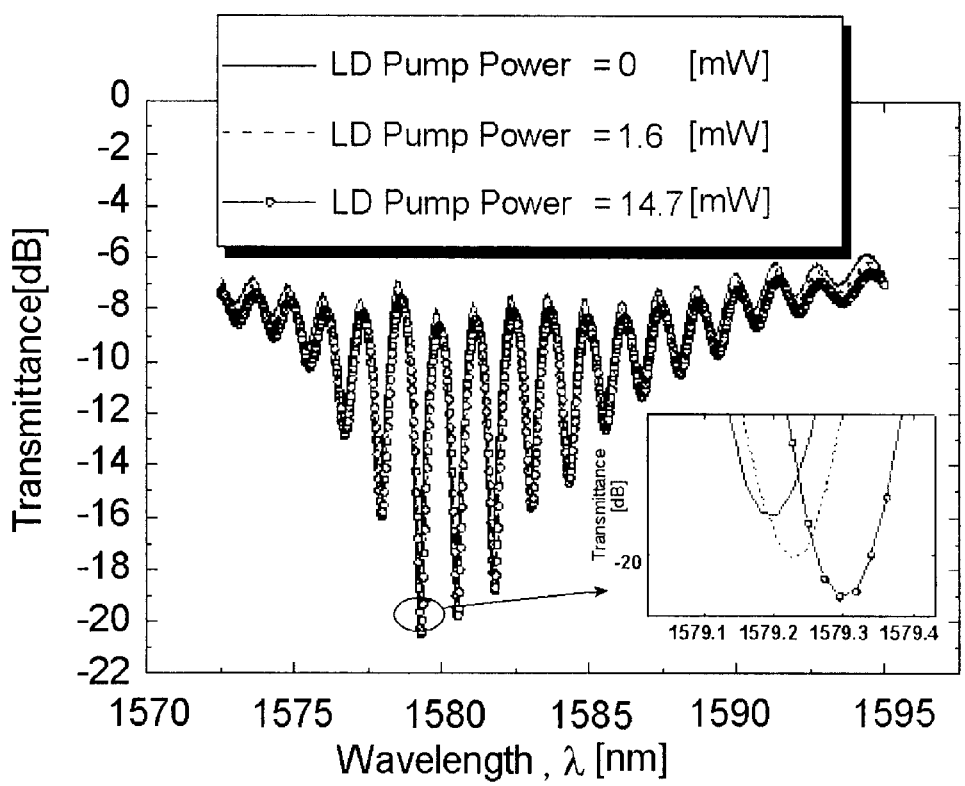
FIG. 2 is a graph showing interference pattern shifts, around 1580 nm, formed by a long period fiber grating pair along with the power variation of a pump light source having 980 nm wavelength in condition that a $Yb^{3+}$ doped optical fiber is used for a nonlinear optical fiber described in FIG. 1.

Inserting a nonlinear optical fiber (20) between a first and a second long period fiber gratings (10a, 10b) as described in FIG. 1, and varying the power of a pump light source (30), an interference pattern shift can be obtained by an optical spectrum analyzer (60) as shown in FIG. 2. Here, the effective refractive index change ($\Delta n_{eff}^{core}$), caused by a pump light source (30), in the core of a nonlinear optical fiber (20) can be obtained by the following equation: (T. J. Ahn, B.-H. Kim, B. H. Lee, Y. Chung, U.-C. Paek, W.-T. Han, "Measurement of refractive index change upon UV irradiation of optical fiber using a LPG pair," Optoelectronics and Communications Conference 2000 Technical Digest, 2000, pp. 12~45)

$$\Delta n_{eff}^{core} \cong \frac{\lambda_p}{L \cdot S} \Delta \lambda \qquad \text{[Equation 1]}$$

where, $\lambda_p$ is the wavelength at which an annihilation interference is occurred without a pump light source, $\Delta \lambda$ is the wavelength shift of $\lambda_p$ along with the power variation of a pump light source, S is the spacing of the interference pattern, and L is the length of a nonlinear optical fiber (20).

Since the effective refractive index change represents a nonlinearity caused by a pump light source (30), a nonlinearity coefficient ($n_2$) can be calculated by the following equation: (G. P. Agrawal, "Nonlinear Fiber Optics," Academic press, San Diego, 1995)

$$n_2 \approx \Delta n_{eff}^{core} \cdot \frac{L}{L_{eff}} \cdot \frac{A_{eff}}{2 \cdot b \cdot P_{pump}} \qquad \text{[Equation 2]}$$

Here, $L_{eff}$ is an effective length of a nonlinear optical fiber (20), of length L, having an absorption coefficient of $\alpha_{pump}$ at the wavelength of a pump light source. $L_{eff}$ is calculated by $$L_{eff} = \frac{1 - e^{-\alpha_{pump} \cdot L}}{\alpha_{pump}}.$$

$P_{pump}$ is the pumping power absorbed in the nonlinear optical fiber (20) and $A_{eff}$ is an effective cross-sectional area of the nonlinear optical fiber (20). And, b is a coefficient, dependent on the polarization states of a pump light source and a light source of which nonlinearity is to be measured, which has a value of ⅔ in an optical fiber having an arbitrary polarization state and has a maximum value of 1 in an optical fiber in which the polarization states of the two light sources are maintained to be identical.

In the embodiments of the present invention, a long period fiber grating pair (10a, 10b) is selected to cause an interference pattern in a wavelength band where nonlinearity is to be measured, but not to cause an interference pattern in a wavelength band of a pump light source (30). And, the wavelength of a pump light source (30) is selected to be included in the light absorption band of nonlinear optical fiber (20).

For example, in case of a fiber grating manufactured by carving the gratings having a period of 200 μm, extended to about 2 cm with an spacing of 10 cm, on a glass optical fiber for grating, of which the difference between the refractive indexes of the core and the clad at 632.8 nm wavelength is 0.01, using an amplitude mask and an UV laser (248 nm), an interference pattern is formed around 1580 nm.

And, for the case of a $Yb^{3+}$ doped nonlinear optical fiber (20), since a $Yb^{3+}$ doped nonlinear optical fiber (20) has a light absorption band around 980 nm, a 980 nm laser diode is used for a pump light source (30). Therefore, the first and the second wavelength division multiplexers (50a, 50b) described in FIG. 1 are selected to be the ones that can divide or combine the wavelengths of 980 nm and 1580 nm.

The interference pattern shift occurred by a long period fiber grating pair (10a, 10b) along with the power variation of a pump light source (30) is observed by an optical spectrum analyzer (60). Here, the measurement error of the result is decided by the wavelength resolution of an optical spectrum analyzer (60). So, for an accurate measurement, the resolution of the optical spectrum analyzer (60) has to be good.

The present invention provides an appropriate method for measuring resonant nonlinearity of a nonlinear optical fiber, which can be used for producing a nonlinear optical fiber (20) as well as developing an optical element using a nonlinear optical fiber. The basic principle of the present invention is to measure the nonlinearity of a nonlinear optical fiber (20) using a long period fiber grating pair (10a, 10b). And thus, in addition to the method of inserting a nonlinear optical fiber (20) between two long period fiber gratings as described before, the present invention also includes a method of measuring nonlinearity of a nonlinear optical fiber by carving a pair of long period fiber gratings on both ends of the nonlinear optical fiber itself.

Hereinafter, an embodiment of the present invention is described in detail, however, the present invention is not limited to the following embodiment.

[Embodiment]

As for a nonlinear optical fiber (20) described in FIG. 1, we eliminated the coating from a 16.7 cm $Yb^{3+}$ doped optical fiber and connected it between a pair of long period fiber gratings (10a, 10b), which cause an interference pattern at 1580 nm, by using a fusion splicer. And then, applying a 980 nm pump light source (30) to the $Yb^{3+}$ doped optical fiber from 0 mW to 22 mW, we observed the interference pattern shifts occurred around 1580 nm by using a broadband light source having a peak wavelength at 1550 nm. Here the resolution of the optical spectrum analyzer (60) was 0.05 nm.

Figure 3:
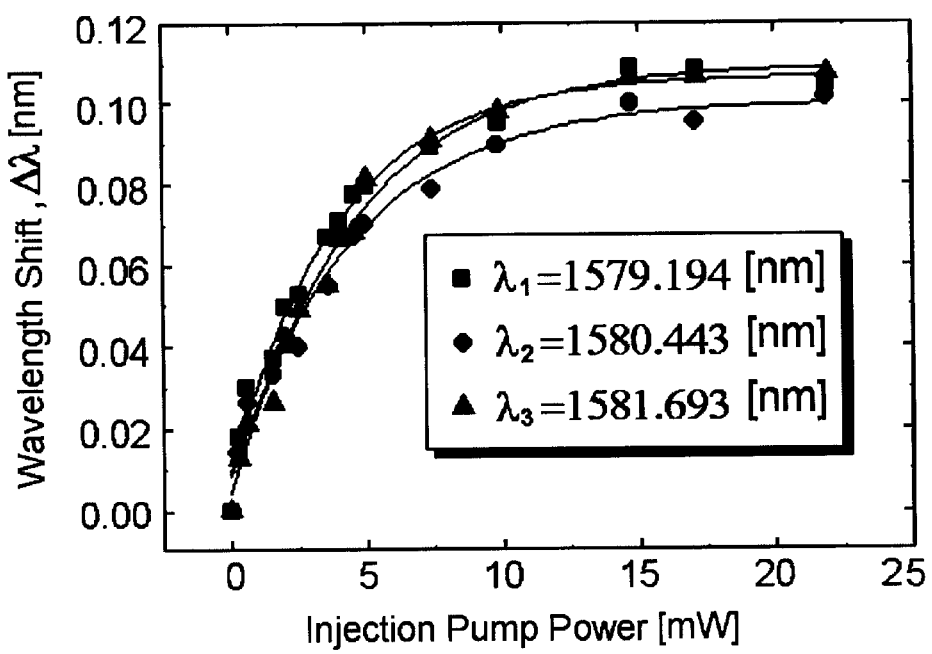
FIG. 3 is a graph showing wavelength shifts of three wavelengths, among the wavelengths, at which annihilation interference is occurred in the interference pattern described in FIG. 2 along with the power variation of a pump light source.
Figure 4:
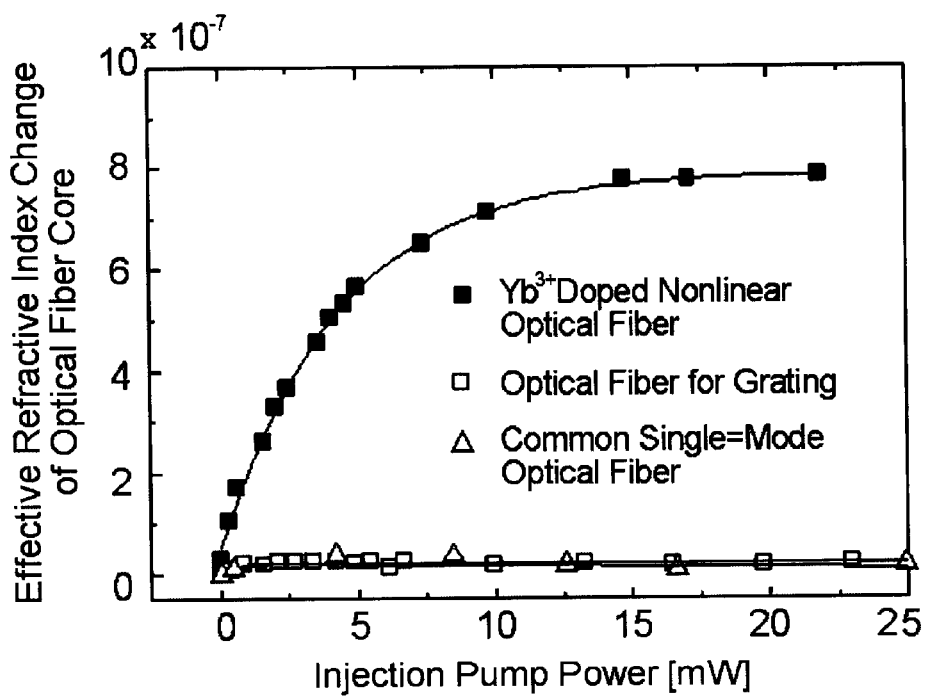
FIG. 4 is a graph comparing the values of effective refractive index changes obtained by using interference pattern shifts along with the power variation of a 980 nm pump light source for the cases that a $Yb^{3+}$ doped optical fiber is used for a nonlinear optical fiber described in FIG. 1 and, instead of a $Yb^{3+}$ doped optical fiber, a common single-mode optical fiber or an optical fiber for grating is used for a nonlinear optical fiber described in FIG. 1.
Figure 5:
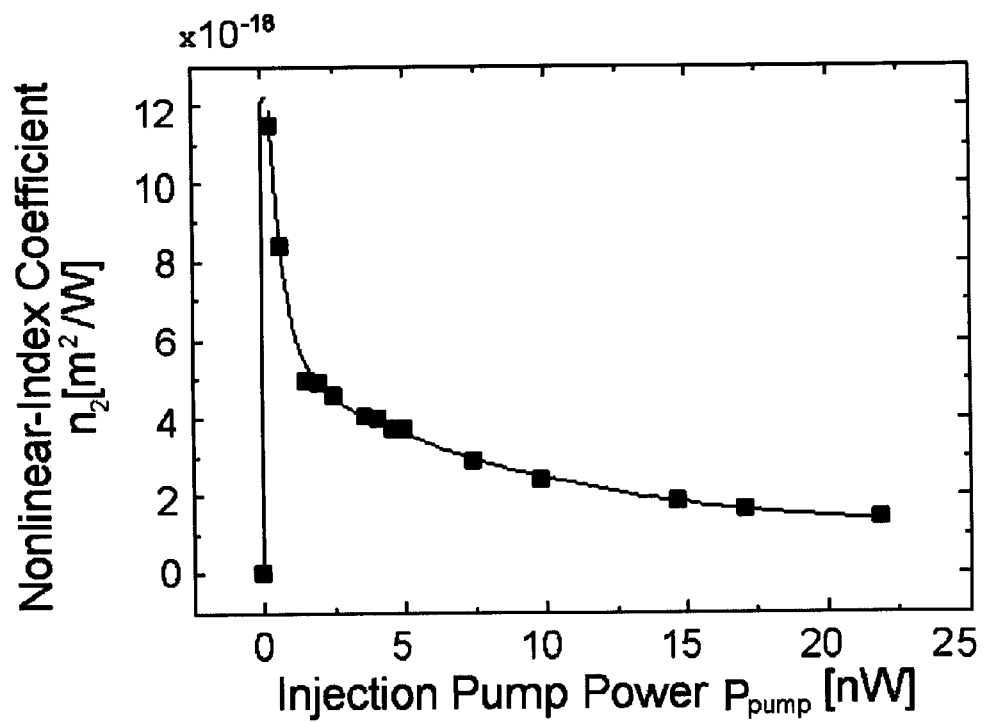
FIG. 5 is a graph showing the values of nonlinear-index coefficient calculated from the interference pattern shifts along with the power variation of a 980 nm pump light source in condition that a $Yb^{3+}$ doped optical fiber is used for a nonlinear optical fiber described in FIG. 1.

Interference pattern shift along with the power variation of a pump light source is described in FIG. 2. For three wavelengths, around 1580 nm, at which annihilation interference is largely occurred, wavelength shift along with the power variation of a pump light source (30) is described in FIG. 3. FIG. 4 shows the values of effective refractive index changes in a $Yb^{3+}$ doped optical fiber calculated by Equation 1 using the average value of the wavelength shifts of the three wavelength in FIG. 3. In addition, the values of nonlinear-index coefficients calculated by Equation 2 using the values of effective refractive index changes are described in FIG. 5.

[Comparative Embodiment 1]

With substituting a 14.8 cm common single-mode optical fiber not having a resonant nonlinearity for the nonlinear optical fiber (20) in the embodiment described above under the same condition, the effective refractive index changes along with the power variation of a pump light source (30) obtained by using the average value of the wavelength shifts of the three wavelength around 1580 nm are described in FIG. 4.

[Comparative Embodiment 2]

With substituting a 13 cm optical fiber for grating not having a resonant nonlinearity for the nonlinear optical fiber (20) in the embodiment described above under the same condition, the effective refractive index changes along with the power variation of a pump light source (30) obtained by using the average value of the wavelength shifts of the three wavelength around 1580 nm are described in FIG. 4.

As shown in FIG. 4, which compares the measurement results of resonant nonlinearity, we can observe a remarkable nonlinearity caused by a pump light source in a nonlinear optical fiber. However, we can hardly notice any nonlinearity caused by a pump light source in a common single-mode optical fiber or an optical fiber for grating, which do not have a resonant nonlinearity.

As mentioned thereinbefore, a measurement method of resonant nonlinearity in a nonlinear optical fiber using a long period fiber grating pair in accordance with the present invention has the following advantages:

Even though the present invention makes use of interference phenomenon of light similar to a Mach-Zehnder interferometer in the prior art, it has an advantage that the interference can be easily occurred by a pair of long period fiber gratings.

In addition, the present invention can reduce an extra nonlinearity possibly caused by thermal effect and measure the resonant nonlinearity only caused by a pump light source applied to a nonlinear optical fiber. And thus, it can measure the resonant nonlinearity of a nonlinear optical fiber more accurately. Consequently, it provides a simple and an economical method for measuring the resonant nonlinearity of a nonlinear optical fiber.

Since those having ordinary knowledge and skill in the art of the present invention will recognize additional modifications and applications within the scope thereof, the present invention is not limited to the embodiments and drawings described above.

What is claimed is:

1. A measurement method of resonant nonlinearity in a nonlinear optical fiber using a long period fiber grating pair characterized by:

connecting a nonlinear optical fiber between a first long period fiber grating and a second long period fiber grating;

injecting light from a pump light source for causing resonant nonlinearity, and at the same time, injecting light from a light source of which the nonlinearity is to be measured through first long period fiber grating or said second long period fiber grating at one side;

transmitting said light from said two light sources through said nonlinear optical fiber and said second long period fiber grating or said first long period fiber grating at the other side; and measuring said light from said light source of which the nonlinearity is to be measured by a spectrum analyzer using the change of interference pattern formed by said long period fiber grating pair.

2. A measurement method of resonant nonlinearity in a nonlinear optical fiber using a long period fiber grating pair as claimed in claim 1, wherein said first long period fiber grating and said second long period fiber grating are carved on said nonlinear optical fiber itself.

3. A measurement method of resonant nonlinearity in a nonlinear optical fiber using a long period fiber grating pair as claimed in claim 1, characterized in that a wavelength band, in which nonlinearity is to be measured using said long period fiber grating pair, is varied by changing the refractive index difference between said long period fiber grating and said nonlinear optical fiber or changing a grating period.

4. A measurement method of resonant nonlinearity in a nonlinear optical fiber using a long period fiber grating pair as claimed in claim 1, wherein said first long period fiber grating, said second long period fiber grating, and said nonlinear optical fiber are made of a glass or a polymer material.

\* \* \* \* \*